(12) United States Patent
Lowe et al.

(10) Patent No.: US 6,433,988 B1
(45) Date of Patent: Aug. 13, 2002

(54) METHOD AND APPARATUS FOR PROTECTION SWITCHING

(75) Inventors: Gregory D. Lowe, Dallas; Dale Moore, Sachse, both of TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 08/964,676

(22) Filed: Nov. 5, 1997

(51) Int. Cl.$^7$ ................................................. H02H 9/00
(52) U.S. Cl. ............................ 361/119; 361/56; 361/115
(58) Field of Search ................................. 361/119, 115, 361/56, 58

(56) References Cited

U.S. PATENT DOCUMENTS 5,557,506 A    9/1996  Wood et al. ............... 361/796
5,897,400 A  * 4/1999  Amberg et al. ............ 439/717

* cited by examiner

Primary Examiner—Stephen W. Jackson
(74) Attorney, Agent, or Firm—Fogg Slifer Polglaze Leffert & Jay, PA

(57) ABSTRACT

An apparatus comprises a protection group. The protection group includes components, a signal bus, including segments and connectors, that couple the components. The components also include a plurality of working components, and a protection component. Each connector is included in a working component. Each segment couples two adjacent components. The signal bus is terminated by the protection component. A method comprises generating a first signal from a plurality of working components. The first signal is analyzed by a protection component to determine if any working component is improperly functioning. The protection component transmits a second signal to the plurality of the working components to turn off an improperly functioning working component. Data signals are routed by coupling the improperly functioning working component through a signal bus to the protection component. The data signals are processed by the protection component.

30 Claims, 2 Drawing Sheets

METHOD AND APPARATUS FOR PROTECTION SWITCHING

FIELD OF THE INVENTION

The present invention generally relates to electrical technology and more specifically, to a method and apparatus for protection switching.

BACKGROUND OF THE INVENTION

Conventional communications systems are configured in a rack with slots coupled together by a bus on a backplane. Working modules are inserted into the slots. Each working module includes equipment for transmitting data at either high or slow speeds. Thus, a single rack may be used to transmit high and slow speed data.

Conventionally, the racks have a fixed number of slots into which working modules for high and slow speed data transmission may be inserted. Conventional communications systems are also preferably designed to permit uninterrupted operation. For example, if a working module, facilitating high speed data transmission, fails, the communications system facilitates high speed data transmission by routing the failed working module to another working module through a protection bus by actuating a protection card. The protection card must be inserted into a specific slot in the rack.

Additionally, the protection card protects only a fixed number of working modules, otherwise known as a protection group. The conventional protection group has a fixed protection ratio. The protection ratio is the ratio of the number of working modules to protection cards. Conventionally, the protection group may comprise no more or less than a specific number working modules and one protection card. Furthermore, the working modules in a protection group must be of a predetermined type, such as for high or low speed data transmission.

Because they use protection groups with fixed protection ratios and predetermined types, the racks have limited configuration alternatives. Therefore, there is a need for a rack permitting flexible configuration.

SUMMARY OF THE INVENTION

The present invention solves the above-mentioned problems in the art and other problems which will be understood by those in the art upon reading and understanding the present specification. The present invention provides a method and apparatus for protection switching for enhancing the flexibility of an electrical system.

One embodiment of an apparatus of the present invention comprises a protection group. The protection group includes components, and a signal bus, including segments and connectors, that couple the components. The components also include a plurality of working components, and a protection component. Each connector is included in a working component. Each segment couples two adjacent components. The signal bus is terminated by the protection component.

In another embodiment, the signal bus comprises a plurality of signal buses, each including segments and connectors, that couple the components. In yet another embodiment, a control bus couples the components. In a further embodiment, the apparatus is a rack with slots, and the components are modules inserted into the slots.

One embodiment of a method of the present invention comprises generating a first signal from a plurality of working components. The first signal is analyzed by a protection component to determine if any working component is not functioning. The protection component transmits a second signal to the plurality of the working components to turn off an improperly functioning working component. Data signals are routed by coupling the improperly functioning working component through a signal bus to the protection component. The data signals are processed by the protection component. It is an advantage of the present invention that it provides flexible configurability.

DETAILED DESCRIPTION OF THE EMBODIMENTS

In the following detailed description of the preferred embodiments, reference is made to the accompanying drawings which form a part hereof and in which is shown by way of illustration specific embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
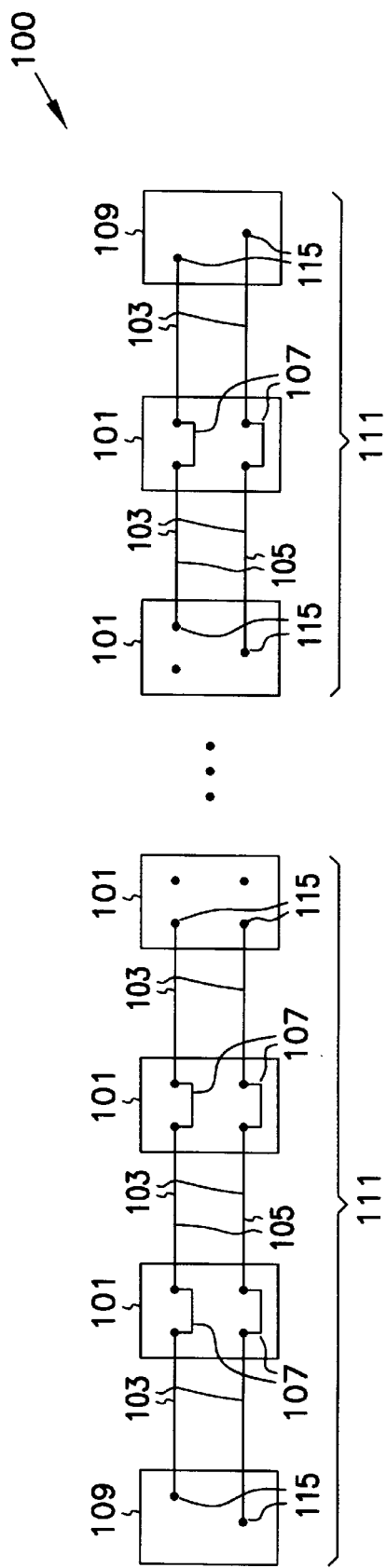
FIG. 1 illustrates one embodiment of the present invention.

The present invention provides a method and apparatus for protection switching. In one embodiment, an electrical system 100 comprises a plurality of working and protection components 101, 109 coupled by one or more signal buses 105, as illustrated in FIG. 1. One signal bus 105 may be used for each independent signal carried by the working and protection components 101, 109. The signal bus 105 is formed by segments 103 and connectors 107. Each segment 103 couples two adjacent components 101, 109 to one another. Each working component 101 may include a connector 107 that couples adjacent segments 103 through the working component 101.

A protection group 111 is formed by coupling a plurality of working components 101 to one or more protection components 109 by one or more signal buses 105. Each protection component 109 includes the componentry and functionality of a working component 101 in its protection group 111. Thus, the protection component 109 can be substituted for a working component 101 when, for example, the working component has failed, or is removed from the electrical system 100 for purposes such as repair or replacement.

Each protection group 111 has a protection ratio that is determined by the ratio of protection components 109 and working components 101. Each protection group 111 is defined by terminating the signal bus(es) 105 at each end of the protection group 111. The termination 115 can be realized by placing a protection component 109 at an end of a corresponding protection group 111. The termination 115 can also be formed by not including a connector 107 in a working component 111.

Figure 2:
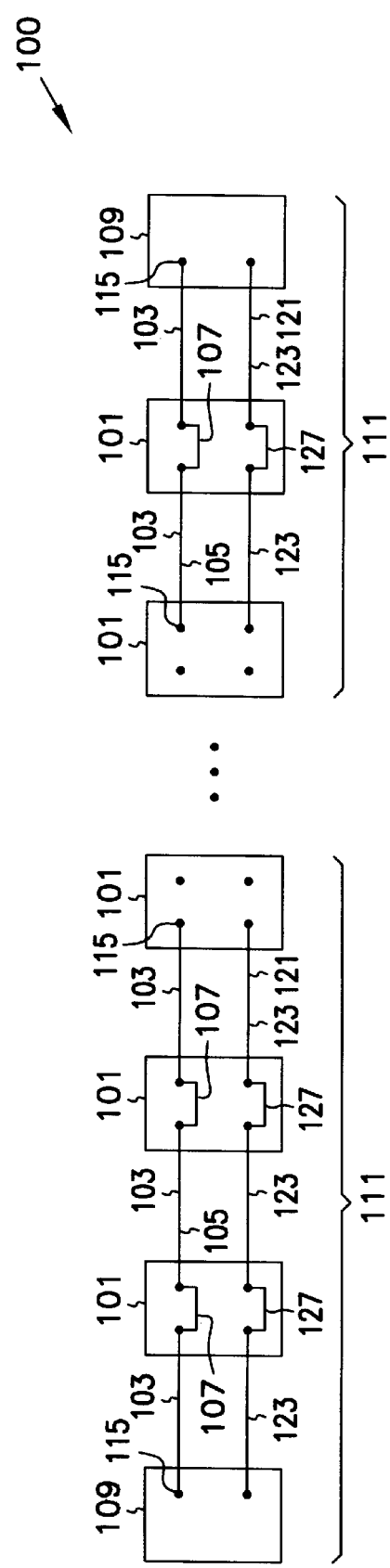
FIG. 2 illustrates another embodiment of the present invention.

In another embodiment, a control bus 121, illustrated in FIG. 2, couples the working and protection components 101, 109 in each protection group 111 to facilitate replacement of a working component 101 by a protection component 109. The control bus 121 is formed by segments 123 and connectors 107, analogous to those used in the signal bus(es) 105 described above. Because the signal and control buses 105, 121 are segmented, any number of working components 101 can be grouped together, for example, with a single protection component 109. Thus, an electrical system 100, such as a rack, described below, can be easily and cost effectively redesigned simply by inserting or removing working and protection components 101, 109 without making any changes to the signal and control buses 105, 121 of the rack. This flexibility arises because the signal and control bus(es) 105, 121 are defined by connectors 107 in working components 101.

Figure 3:
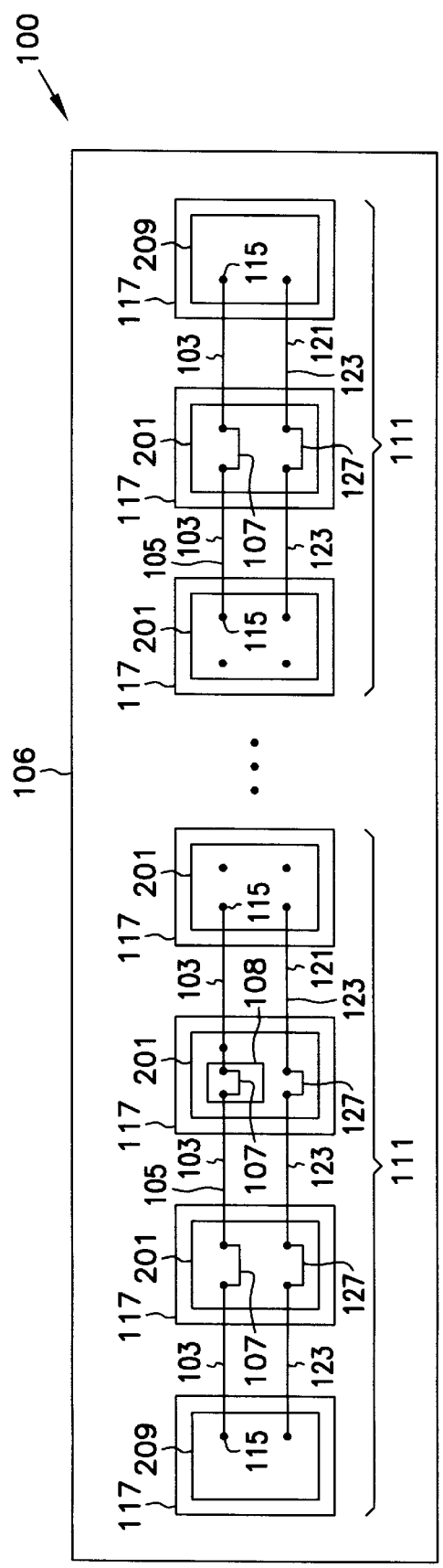
FIG. 3 illustrates yet a further embodiment of the present invention.

In yet another embodiment, the electrical system 100 may be a communications system, including a rack 106 having slots 117, as illustrated in FIG. 3. In this embodiment, the working and protection components 101, 109 are respectively working and protection modules 201, 209 that may be inserted into the slots 117. The segments 103, 123 of the signal and control buses 105, 121 are adjacent to the slots. In another embodiment, also illustrated in FIG. 3, a working module 201 may include a card 108 onto which the connector 107 is attached.

In yet a further embodiment, protection groups 109 for high and low speed data formats may be created. The data formats may include DS1, DS3, E1, and E3 formats. For example, in one embodiment, a protection group 111 comprises seventeen slots 117 into which are inserted sixteen working modules and one protection module for transmitting T1 formatted data. In yet another embodiment, the high and low speed protection groups 111 are each coupled by signal buses 105 having different impedances. For example, in one embodiment, the signal buses 105 for the high speed protection group have a characteristic impedance of fifty ohms.

In one embodiment, a control signal on the control bus 121 is used to switch between a working module 201 and its corresponding protection module 209. Each working component 101 in a protection group 111 sends a first signal to a protection component 109 on a control bus 121 indicating whether the working component 101 is functional or functions improperly. In a further embodiment, the protection component 109 responds with a second signal sent on the control bus 121 to each working component 101 in the protection group 111 that disables any working component 101 that indicated that it was functioning improperly in the first signal.

Figure 4:
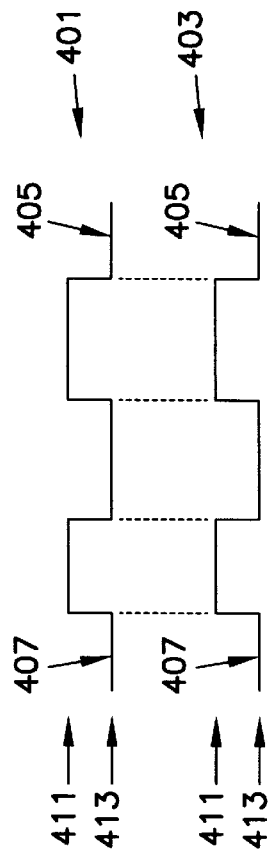
FIG. 4 illustrates signals in yet another embodiment of the present invention.

In another embodiment, as illustrated in FIG. 4, the first and second signals 401, 403 are binary sequences, and are described below. The first and second signals 401, 403 will now be exemplified for a protection group 111 comprising a series of N working components 101 terminated by a protection component 109. The Nth working component is adjacent to the protection component 109. The binary sequence of the first signal 401 is formed by each working component 101 sequentially adding a bit to the first signal 401. The first signal 401 begins at the first working component and travels along the control bus 121 toward the protection component 109. A first signal 401 bit logic level of one indicates that the corresponding working component 101 functions properly or within normal parameters. A first signal 401 bit logic level of zero indicates that the corresponding working component 101 is functioning improperly, or is experiencing abnormal operation. For both the first and second signals 401, 403 present at the protection component 109, the most significant bit 405 corresponds to the Nth working component; the least significant bit 407 corresponds with the first working component. Upon its receipt, the protection component 109 analyzes the first signal 401 and determines if any one of the working components 101 is not functional.

Based upon the first signal 401, if the protection component 109 determines that a working component 101 is functioning improperly, it transmits the second signal 403, described below, that turns off the improperly functioning working module, and routes the data signals coupled to the improperly functioning working module through the signal bus(es) 105 to the protection module 109. The protection module 109 then processes the data signals in lieu of the improperly functioning working module.

The protection component 109 sends the second signal 403 to the working components 101. The Nth working component strips of the most significant bit 405 from the second signal 403. The remaining bits are then shifted up by one bit. Thus, the bit adjacent to the most significant bit 405 becomes the new most significant bit 405. This process is repeated for each of the remaining working components 101. A second signal 403 bit logic level of zero turns off, or disables, a corresponding working component 101. A second signal 403 bit logic level of one enables, or maintains the on state of, a corresponding working component 101.

Conclusion

The present invention provides a method and apparatus for protection switching. It is an advantage of the present invention that it can be flexibly configured.

It is understood that the above description is intended to be illustrative, and not restrictive. For example, the present invention can be implemented for other electrical systems, such as control systems. Furthermore, other logic levels and control signals can be used. Many embodiments will be apparent to those skilled in the art upon reviewing the above description.

What is claimed is:

1. An apparatus, comprising:
   a protection group including,
      components, including
         a plurality of working components, and
         a protection component,
      a signal bus, including segments and connectors, coupling the components,
         wherein each connector is included in a working component,
         wherein each segment couples two adjacent components, and
         wherein the signal bus is terminated by the protection component.

2. The apparatus of claim 1, wherein the signal bus comprises a plurality of signal buses, each signal bus including segments and connectors, that couple the components.

3. The apparatus of claim 1, further comprising a control bus coupling the components.

4. The apparatus of claim 1, further comprising a second protection group.

5. The apparatus of claim 1, wherein the apparatus is a communications system.

6. The apparatus of claim 1, wherein the apparatus is a control system.

7. An apparatus, comprising:
a rack for communications systems including slots adapted to receive modules, and first and second segments adjacent to the slots, wherein the first and second segments are adapted to be coupled by a module.

8. The apparatus of claim 7, further comprising:
a protection group including,
   modules, inserted into the slots, including
      a plurality of working modules, and
      a protection module,
   a signal bus, including the first segments and connectors, coupling the modules,
   wherein each connector is included in a working module,
   wherein each segment couples two adjacent modules, and
   wherein the signal bus is terminated by the protection module.

9. The apparatus of claim 8, wherein each working module includes a board to which the connector is attached.

10. The apparatus of claim 8, wherein the signal bus comprises a plurality of signal buses, each signal bus including the first segments and connectors, coupling the modules.

11. The apparatus of claim 8, further comprising a control bus, including the second segments and second connectors, coupling the modules.

12. The apparatus of claim 8, further comprising a second protection group.

13. The apparatus of claim 8, wherein the apparatus is a communications system.

14. The apparatus of claim 8, wherein the apparatus is a control system.

15. A method, comprising the steps of:
generating a first signal from a plurality of working components;
analyzing the first signal at a protection component to determine if any working component is improperly functioning;
transmitting a second signal from the protection component to the plurality of the working components to turn off an improperly functioning working component;
routing data signals coupled to the improperly functioning working component through a signal bus to the protection component; and
processing the data signals with the protection component.

16. The method of claim 15, wherein the step of generating further comprises the steps of:
generating a first signal that is a binary sequence having bits, each bit supplied by each of the plurality of working components;
wherein a bit binary level of one corresponds to a functioning working component; and
wherein a bit binary level of zero corresponds to the improperly functioning working component.

17. The method of claim 15, wherein the step of transmitting further comprises the steps of:
transmitting a second signal that is a binary sequence having bits, each bit corresponding to each of the plurality of working components;
wherein a bit binary level of one enables a corresponding working components; and
wherein a bit binary level of zero disables a corresponding improperly functioning working component.

18. A method, comprising the steps of:
generating a first signal from a plurality of working modules in a protection group in a rack;
analyzing the first signal at a protection module in the protection group to determine if any working module is improperly functioning;
transmitting a second signal to the plurality of the working modules to turn off an improperly functioning working module;
routing data signals coupled to the improperly functioning working module through a signal bus to the protection module; and
processing the data signals with the protection module.

19. The method of claim 18, wherein the step of generating further comprises the steps of:
generating a first signal that is a binary sequence having bits, each bit supplied by each of the plurality of working modules;
wherein a bit binary level of one corresponds to a functioning working module; and
wherein a bit binary level of zero corresponds to the improperly functioning module component.

20. The method of claim 18, wherein the step of transmitting further comprises the steps of:
transmitting a second signal that is a binary sequence having bits, each bit corresponding to each of the plurality of modules;
wherein a bit binary level of one enables a corresponding working module; and
wherein a bit binary level of zero disables a corresponding improperly functioning module component.

21. An apparatus, comprising:
a rack for communications systems including a plurality of slots adapted to receive N working modules and at least one protection module, and first and second segments adjacent to each slot, wherein the first and second segments are adapted to be coupled by a module inserted in the glot.

22. The apparatus of claim 21, further comprising:
a protection group including
   modules, inserted into the slots, including
      a plurality of working modules, and
      at least one protection module, and
   a signal bus, including the first and second segments and connectors, coupling the modules.

23. The apparatus of claim 22, wherein each connector is included in each of the plurality of working modules.

24. The apparatus of claim 22, wherein each of the first and second segments couples two adjacent modules.

25. The apparatus of claim 22, wherein the signal bus is terminated by the protection module.

26. The apparatus of claim 22, wherein the signal bus comprises a plurality of signal buses, each signal bus including the first segments and connectors, coupling the modules.

27. The apparatus of claim 22, further comprising a control bus, including the second segments and connectors, coupling the modules.

28. The apparatus of claim 22, wherein the protection group comprises a plurality of protection groups.

29. The apparatus of claim 22, wherein the apparatus is a control system.

30. The apparatus of claim 22, wherein the apparatus is a communications.

* * * * *